No. 846,060.

PATENTED MAR. 5, 1907.

O. SELG.
SEPARATOR.
APPLICATION FILED SEPT. 24, 1906.

Witnesses
Arthur Zumpe
William Schulz

Inventor
Otto Selg,
By his Attorney

UNITED STATES PATENT OFFICE.

OTTO SELG, OF NEW YORK, N. Y.

SEPARATOR.

No. 846,060.  Specification of Letters Patent.  Patented March 5, 1907.

Application filed September 24, 1906. Serial No. 336,031.

*To all whom it may concern:*

Be it known that I, OTTO SELG, a citizen of the United States, residing at New York city, Brooklyn, county of Kings, State of New York, have invented new and useful Improvements in Separators, of which the following is a specification.

This invention relates to an improved apparatus for separating heavier from lighter particles by utilizing the difference in their specific gravity.

The apparatus is designed more particularly for enabling brewers to separate the heavy active yeast-cells from the lighter and dead cells, but may also be used for other purposes.

Figure 1:
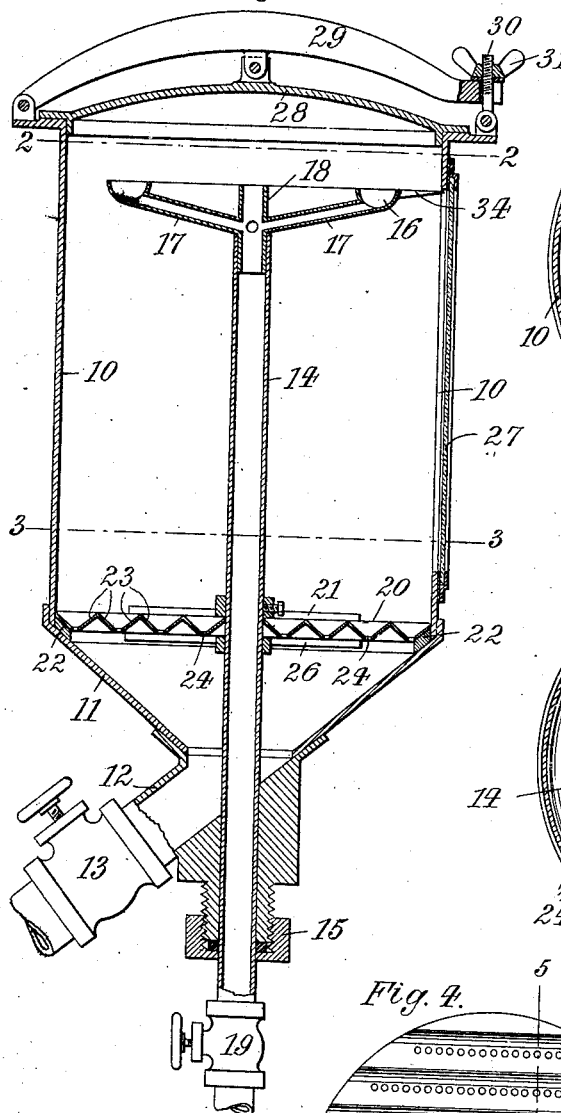
Figure 2:
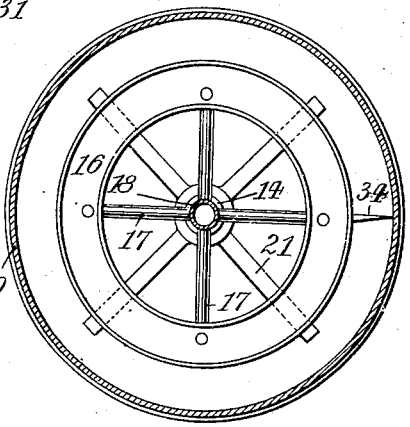
Figure 3:
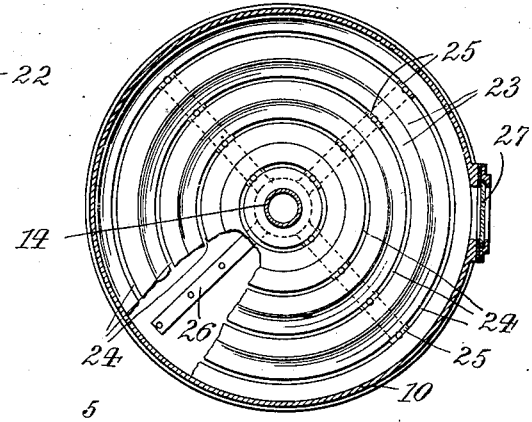
Figure 4:
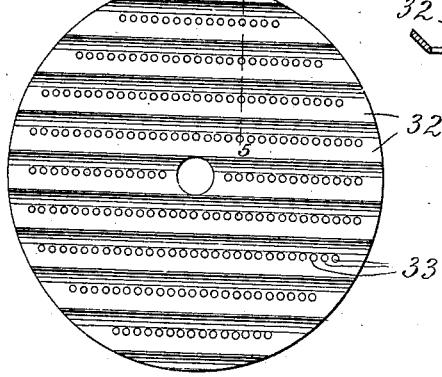

In the accompanying drawings, Figure 1 is a longitudinal section of my improved separator; Fig. 2, a cross-section on line 2 2, Fig. 1; Fig. 3, a cross-section on line 3 3, Fig. 1; Fig. 4, a detail of a modification of the false bottom; and Fig. 5, a section on line 5 5, Fig. 4.

The cylindrical body 10 of the separator has a tapering base 11, into which enters a pipe or nipple 12, controlled by cock 13. Axially through vessel 10 extends an overflow or outlet pipe 14, which passes through a stuffing-box 15 of base 11 and is vertically movable within the vessel. A trough 16, provided with radial ducts 17 and a central nozzle 18, is removably secured to the mouth of pipe 14 by fitting said nozzle into the pipe. The lower or outlet end of pipe 14 is controlled by a cock 19.

Figure 5:
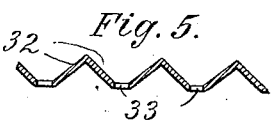

Above the coniform base 11 shell 10 contains an open false bottom 20, arranged below the upper or inlet end of pipe 14. This bottom may be held to its seat by a spider 21 and is provided with a reinforcing-ring 22. The false bottom 20 is corrugated, being provided with a series of sloping ridges 23 and openings 24 in the furrows between said ridges of such a width as to allow the ready passage of the yeast-cells. As shown in Figs. 1 and 3, the ridges 23 are made in the form of concentric rings, while the openings 24 are made in the form of intervening concentric slots. The rings are connected to each other by radially-extending webs 25, the whole being reinforced by a cruciform support 26, arranged below such webs and riveted thereto, as shown. Vessel 10 is further provided with an observation-glass 27, along which moves a pointer 34 of trough 16. The cover 28 of vessel 10 has a pivoted bail 29, which may be locked to the vessel by the usual hinge-bolt 30 and nut 31. In Figs. 4 and 5 the false bottom is shown to be composed of a number of straight parallel ridges 32 with intervening perforations 33.

In using the apparatus for washing yeast the overflow-pipe 14 is adjusted so that the trough 16 will assume the level desired. The brewers' yeast as obtained from the fermenting-tub is poured into vessel 10, the cover 28 is closed, and a washing medium under pressure—such as water, beer, &c.—is admitted into vessel 10 through nipple 12. This washing medium rising slowly and continuously through the perforations of the false bottom will effectively loosen the yeast and the various particles contained therein, the formation of any stagnant or dead pools being prevented by the sloping sides of ridges 23. By means of the perforated false bottom the washing medium, entering through nipple 12, is distributed to uniformly rise in all parts of vessel 10, while the false bottom furthermore prevents any whirling or gyratory movement of the washing medium. By the loosening process above described the light and useless yeast-cells will be raised to the mouth of the overflow and will be discharged through trough 16, nozzle 18, and pipe 14, while the heavier active cells will remain near the bottom. To insure a proper and reliable operation, the velocity of the inflowing washing medium must be so regulated by cock 13 that the weight of the heavy yeast-cells exceeds the lifting power of the washing medium. In this way the heavy active cells are prevented from being raised by the washing medium, but will collect by subsidence on tapering base 11. The inactive cells, on the other hand, are raised by the washing medium to be discharged together with the same out of pipe 14. When the matter discharged through pipe 14 is clear, the supply of the washing medium through nipple 12 is discontinued, and the contents of vessel 10 are allowed to settle, so that the water will separate from the yeast. Pipe 14 is now lowered to bring trough 16 into a horizontal plane with the surface of the yeast, so that all water standing above the same will run off through said pipe. Finally the separated yeast is either discharged directly through nipple 12, or it is diluted with beer before being so discharged.

I claim—

1. In a separator, a shell having a tapering base and a stuffing-box, combined with an open false bottom, an inlet-pipe entering the base below said bottom, and a vertically-movable outlet-pipe extending through the vessel and engaging the stuffing-box, substantially as specified.

2. A separator provided with a bottom having a series of sloping ridges, and openings in the furrows between said ridges, substantially as specified.

3. In a separator, a shell, combined with an inclosed false bottom having a series of sloping ridges and intervening openings, and with an inlet below said bottom and an outlet above said bottom, substantially as specified.

4. In a separator, a shell having a tapering base, combined with a false bottom having sloping ridges and intervening openings, an inlet-pipe below said bottom, and a vertically-movable outlet-pipe extending above said bottom, substantially as specified.

5. In a separator, a shell, combined with an inclosed false bottom having a series of ridges and intervening openings, an inlet below said bottom, an adjustable outlet-pipe extending above said bottom, and a trough connected to the upper end of said pipe, substantially as specified.

Signed by me at New York city, (Manhattan,) New York, this 21st day of September, 1906.

OTTO SELG.

Witnesses:
 FRANK V. BRIESEN,
 WILLIAM SCHULZ.